Figure 1:
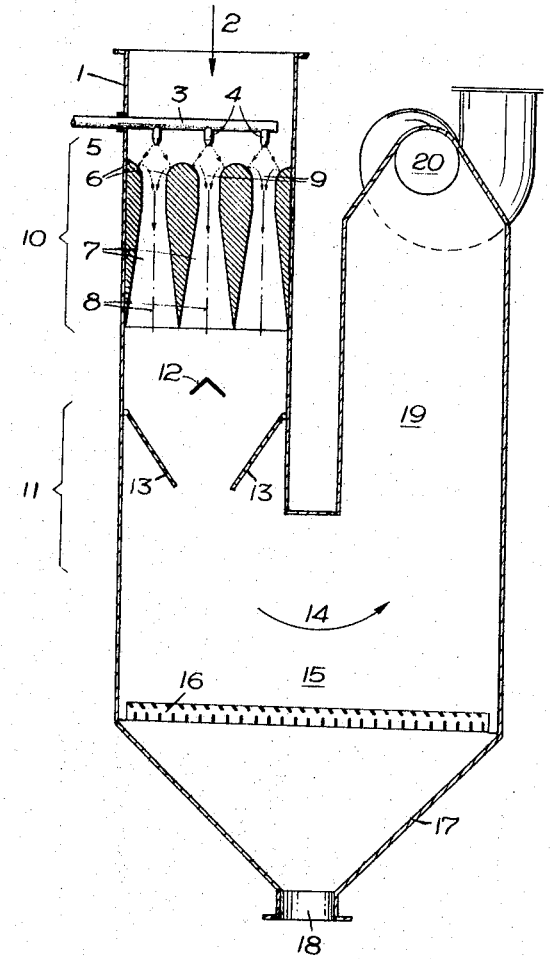

United States Patent Office 3,339,344
Patented Sept. 5, 1967

3,339,344
METHOD AND APPARATUS FOR SEPARATING SUSPENDED PARTICLES FROM GASES
Josef Pallinger, Vienna, Austria, assignor to Waagner-Biro Aktiengesellschaft, Vienna, Austria
Filed Oct. 7, 1964, Ser. No. 402,692
Claims priority, application Austria, Oct. 8, 1963,
A 8,064/63
8 Claims. (Cl. 55—90)

The present invention relates to a method and apparatus for separating suspended particles from gases, particularly for separating finely divided solid particles such as dust and the like from gases in which they are suspended, these particles being contacted with an auxiliary medium such as a suitable liquid and the flow of the stream of the gaseous suspension being controlled to separate the solids out of the gas.

It is well known, for example, to direct a gaseous stream having fine solid particles suspended therein through venturis while spraying the gaseous stream with a liquid such as water so as to entrain the solid particles in the finely divided liquid and thereafter separate the liquid from the gas so that the solids will be carried off with the liquid. Structures of this latter general type operate very well at full load. However, when they operate at partial load so that only a fraction of the full load gas volume passes through the apparatus, the degree of separation of solids from the gases very sharply drops off and the problem of operating a structure of this type at partial load while still maintaining the desired high degree of separation of solids from the gases has not yet been satisfactorily solved.

It is, therefore, a primary object of the present invention to provide a process and apparatus which will be capable of maintaining a high degree of separation of solids from the gases even when the apparatus operates at partial load.

It is furthermore an object of the present invention to provide additional features which will enhance the degree of separation of solids from the gases primarily by promoting a more intimate mixing of the auxiliary medium, such as water, with the stream of suspended solid particles.

In particular, it is an object of the invention to provide a structure of the above type which can adapt the partial operations to the particular operating characteristics of a blower which is used to move the gaseous stream through the apparatus.

With these objects in view, the invention includes in a process for separating solids from a gas in which they are suspended, the steps of mixing the gaseous stream of suspended solids with a medium such as a suitable liquid spray and then passing the stream through a venturi. In accordance with the invention downstream of the venturi the flow of the stream is throttled to an increasing extent as the volume of gas passing through the venturi drops so that the drop in speed of the stream through the venturi as the gas volume drops is compensated by the increasing speed produced by increased throttling subsequent to the venturi, and thus the drop in the degree of separation of solids can be maintained relatively high with the process of the invention. The apparatus of the invention includes in the duct in which the venturi is located a throttling means situated downstream of the venturi and capable of being adjusted so as to throttle the stream to an increasing extent as the volume thereof decreases.

Figure 2:
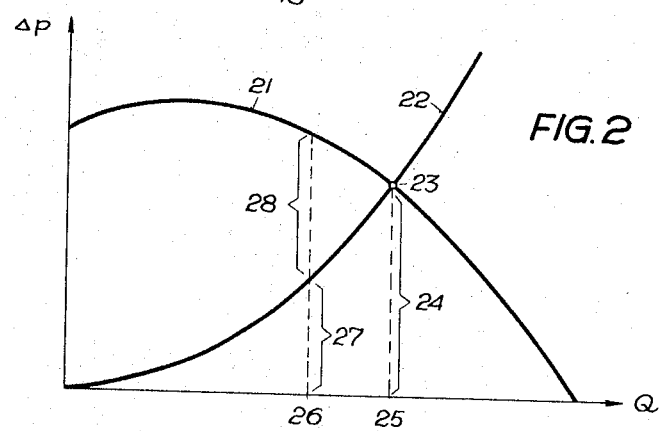
Figure 3:
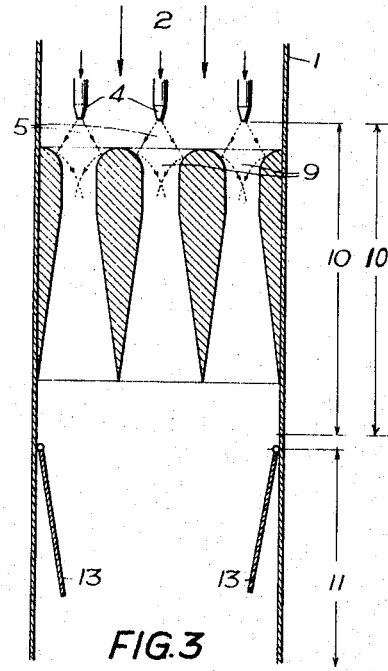
Figure 4:
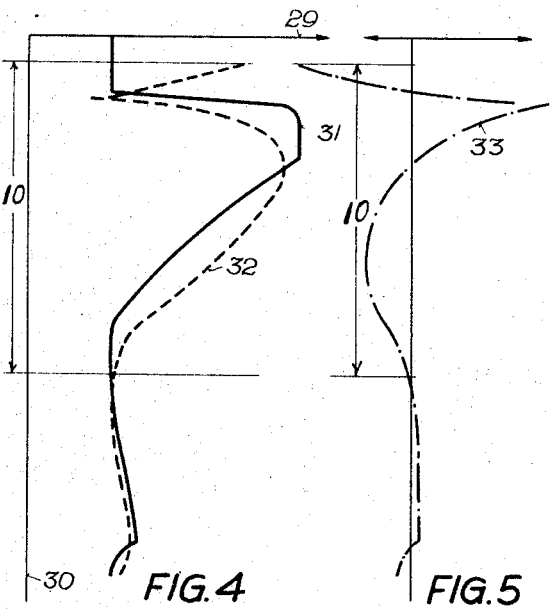
Figure 5:
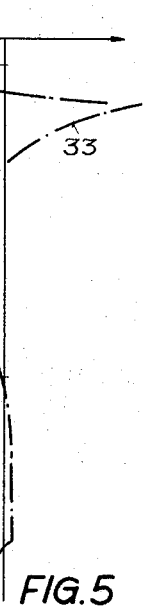
Figure 6:
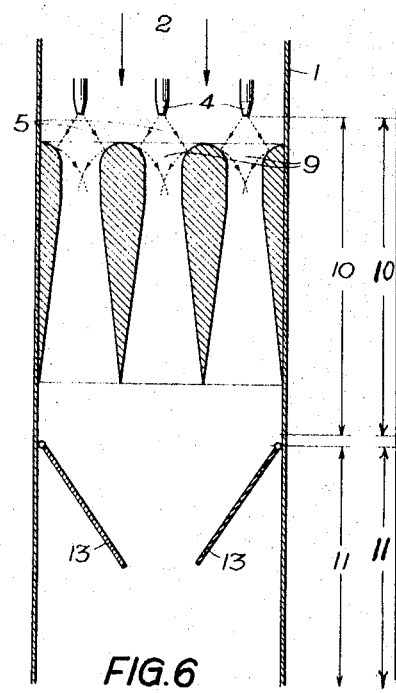
Figure 7:
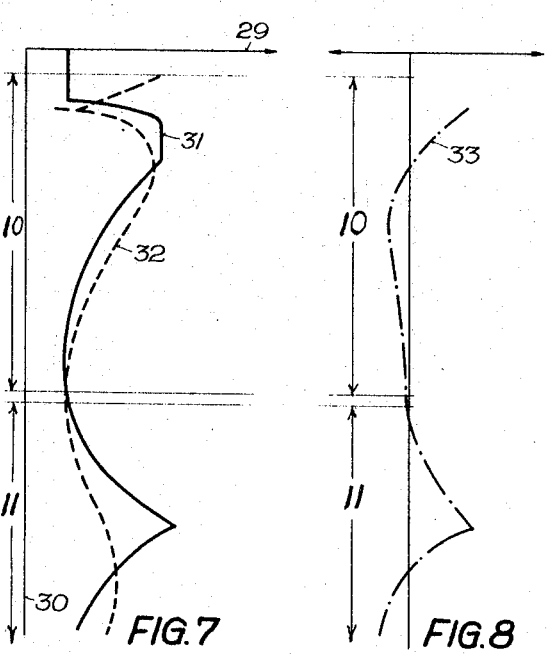
Figure 8:
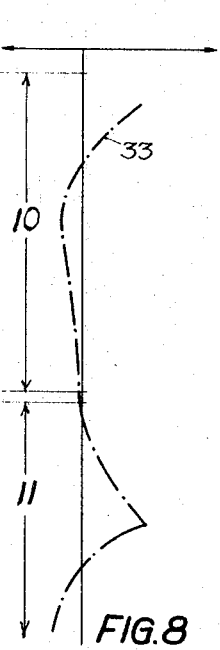

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 diagrammatically illustrates one possible apparatus according to the invention which operates according to the process of the invention;

FIG. 2 is a graph illustrating the pressure drops achieved with the blower in the different parts of the apparatus;

FIGS. 3–5 graphically illustrate the relationship between the speed of flow of the gas and liquid droplets with a substantially unthrottled stream where the apparatus operates at full load; and FIGS. 6–8 illustrate the relationship between the speed of the gaseous stream and liquid droplets under partial load conditioners where the throttling is increased to compensate for the partial load, in accordance with the invention.

Referring to FIG. 1, reference numeral 1 denotes a conduit through which a gas carrying finely subdivided particles flows in the direction of arrow 2. Nozzle arrangement 3 serves for introducing a liquid into the stream of gas. This liquid is introduced through nozzles 4 in the form of a veil of droplets which are sprayed against the entry walls 6 of venturi pipes 7 and which will be reflected towards the venturi axes 8 to form a veil of droplets substantially filling the venturi pipes at 9. Due to the reflecting of the droplets, the same have been further reduced in size and thus are particularly advantageous for the removal of dust from the stream of gas. From this first treating stage 10, the mixture of gas and liquid droplets passes to a second treating stage 11. An interposed distributor or baffle means 12 directs the stream against the flaps 13 of second treating zone 11. These flaps are opened more or less depending on the amount of gas passing through per unit of time. At maximum gas passage, flaps 13 are fully opened and positioned parallel to and in contact with the wall of the gas conduit. In this position, the flaps have no influence on the stream of gas. However, even by slightly moving the flaps in a direction toward a closed position, a sudden change in the available cross-sectional area occurs and causes a throttling of the gas stream. By this throttling, as will be explained in connection with FIG. 2, the amount of gas passing through per unit of time will be reduced. Preferably, the flaps 13 are of asymmetric configuration, i.e. one flap is longer than the other so that the direction of flow of the gas passing through the partially opened flaps will be changed in the direction of arrow 14 in the next following perpendicular conduit 15, whereby the particles which were initially suspended in the gas and which are now occluded in the liquid droplets will fall downwardly and will be removed through grating 16. The thus contaminated washing liquid is then withdrawn through funnel 17 and outlet 18 while the thus derived gas, i.e. the gases from which the suspended particles have been removed pass into a conduit 19 and are sucked off by suction pump 20.

In FIG. 2 numeral 21 indicates the blower throttling curve or characteristic operating curve of the blower 20 of FIG. 1. The delivery of gas per unit of time through blower 20 is indicated along the abscissa and the pressure drop produced by the blower is indicated along the ordinate. This curve obviously is valid only for a given rotational speed of the blower. Curve 22 corresponds primarily to the losses occurring in treating zone 10 of FIG. 1 but includes also all other very insignificant losses in the treating zones preceding and succeeding zone 10. However, the losses which are caused in treating zone 11 are not taken into consideration in curve 22 since these losses occur in a basically different manner.

The gas throughput at the point 23 where curves 21 and 22 intersect each other corresponds about to that which will be experienced with fully opened flaps 13 in which position the flaps cause practically no loss and the total pressure drop 24 produced by blower 20 may be used to overcome the losses occurring in the different portions having an unchanging cross-sectional area. Point 23 corresponds to the gas volume 25 which is the maximum which can be passed through the device of FIG. 1 at the given rotational speed of the blower. In order to reduce the amount of gas, for instance to that indicated at 26, the flaps 13 of treating stage 11 must be placed in a correspondingly partially closed position. In this case, to overcome the losses which occur in the parts of the conduit which have an unchanging cross-section, particularly in treating zone 10, the pressure drop 27 will be required. The now remaining pressure drop 28 is utilized for producing maximum speed in treating zone 11. It will be seen from the increase of pressure drop 28 with reducing gas throughput that by progressive closing of flaps 13, the maximum speed of gas passing between the same will be increased. However, the speed in the other portions of the conduit will be reduced thereby. FIG. 2 thus proves the operability of the method, which will be described in connection with the following figures of the apparatus of FIG. 1.

In FIGS. 3–5 identical reference numerals have the same meansing as in FIG. 1. FIGS. 4 and 5 illustrate the speed of the gases and liquid droplets during passage through the device of FIG. 3. These speeds are plotted along the horizontal axis 29 while the vertical axis 30 represents flow at horizontal projections from the structure of FIG. 3. Curve 31 illustrates the speed of flow of the gas through treating zones 10 and 11 as well as adjacent conduit portions while the dotted line 32 indicates in a similar manner the speed of flow of the liquid droplets. With the nearly completely opened flaps 13 of FIG. 3, the speed of flow of the gas reaches a high value in treating zone 10 and drops strongly thereafter. These high and unchanging speeds result in high values for the relative speed between liquid droplets on the one hand and gas stream on the other hand within treating zone 10. This relative speed, or speed differential, is shown in dash-dot line 33 of FIG. 5. In the treating zone 11, the speed of flow of the gas is much lower and changes only very little and the same holds true for the corresponding relative speed between the gas stream and the liquid droplets.

In FIGS. 6–8 the same reference numerals have again the same meaning as in FIGS. 3–5. FIGS. 6–8 illustrate the flow condition with reduced throughput of gas. Correspondingly in the first treating zone 10 the speed of gas and liquid droplets as well as the relative speed between gas and liquid droplets is quite low. These speeds are essential for good dust removal effect. The gas with the liquid droplets suspended therein passes then from the first separating or treating zone 10 through the second separating or treating zone 11 and herein, with reduced gas throughput, the speed of flow of the gases is increased. This is achieved in accordance with the illustrated example by further closing the gap between flaps 13. In connection with FIGS. 1 and 2, it has been shown that by thus reducing the available cross-section, in fact the speed of flow of the gas can be increased. Quite obviously, this is an extremely simple method of control of the speed of flow.

According to a further feature of the invention, the gas stream is throttled in treating zone 11 and upon flowing in the suddenly increased cross-sectional area, after leaving the opening between flaps 13, a great degree of turbulence is caused. This turbulence will again cause an intensive mixing between gas and liquid droplets. Furthermore, the throttling of the gas stream between flaps 13 will also control the amount of gas which is sucked off or blown off by blower 20. All of these last described features are achieved by means of a very simple flap arrangement and the pair of flaps may consist, for instance, of two hingedly arranged plates terminating in sharp free edges, respectively.

The present invention is not limited to the embodiment described herein. For instance it is possible to arrange in treating zone 11 a plurality of pairs of flaps instead of the single pair of flaps which has been illustrated. It is also possible to replace the throttling arrangement formed by the pair of flaps with other controllable arrangements for reducing the cross-sectional area of the conduit within treating zone 11 combined with a sequentially arranged diffuser. Since in this latter case the throttling cross-section remains constant, the throughput of gas must be controlled in a different manner, for instance by changing the rotational speed of blower 20.

As will be apparent from the above description of the process and apparatus of the invention, certain advantages are achieved with the invention as follows:

(1) The rebounding of the liquid issuing from the nozzles 4 at the upstream ends of the venturis to provide the additional droplet curtains 9 greatly enhances the separation of the particles because of the reduction in the size of the droplets resulting from this rebounding.

(2) The sudden increase in volume just beyond the sharp free edges of the flaps 13 induces in the stream a very great turbulence which further enhances the intimate mixing of the droplets with the gaseous stream so as to provide in this way a higher degree of separation.

(3) The degree of separation of the solids will depend in large measure on the differential between the speeds of movement of the liquid droplets and the gas. The greater this differential the greater the separation. As may be seen from FIGS. 3–5, when operating at full load or substantially full load the flaps 13 provide practically no throttling and because of the relatively large gas volume the speed of flow through the throats of the venturis is very high so that there is at this time a great differential between the speeds of movement of the gas, on the one hand, and the liquid droplets, on the other hand, as may be seen from a comparison of the curves 31 and 32 of FIG. 4 and as is particularly demonstrated by the curve 33 of FIG. 5, this curve 33 representing the difference between the curves 31 and 32. Thus, with this arrangement, which corresponds in a general way to known structure where no throttling is provided, there will be an effective separation as a result of the speed differential between the gas and the liquid droplets.

However, when operating at partial load, as indicated in FIGS. 6–8, the lesser volume of gas will necessarily flow at a slower speed through the venturis with the result that the relatively great differential between the speeds of the gas and liquid droplets no longer obtains, and therefore an operation as shown at the upper part of FIG. 7 is produced where the difference between the curves 31 and 32 is represented by the relatively small differential curve 33 at the upper portion of FIG. 8. However, with the invention, when operating at partial load the throttling will be increased, and thus the position of flaps 13 in FIG. 6 may be compared with the position thereof in FIG. 3 to show the greater throttling which is provided in accordance with the invention under these conditions. As a result, in the second stage 11 where the greater throttling is now provided there will be a considerably greater differential in the speed of the gas and liquid droplets, as is apparent from the lower part of FIG. 7, resulting from the increase in the speed of the stream produced by the throttling thereof, and thus the lower part of FIG. 8 shows the greater differential in the relative speeds of the gas and liquid droplets provided with the invention when operating at partial load so as to achieve even under these conditions a high degree of separation.

(4) The structure of the invention adapts the flow to the particular characteristics of the blower, as was pointed out above in connection with FIG. 2.

(5) The throttling of the stream at partial load not only increases the speed of the stream so as to achieve better separation, as pointed out above, but in addition it has the effect of propelling the stream along the duct so as to provide a more efficient flow.

It will be understood that each of the elements described above, or two or more together, may also find a useful application in other types of separators differing from the types described above.

While the invention has been illustrated and described as embodied in separation of solids from gases, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a process for separating from a gas fine solid particles suspended therein, the steps of contacting the gas with a liquid spray providing droplets in which the solid particles are entrained; directing a stream of the thus-sprayed gas through a first duct of venturi configuration and then through a second duct which is a continuation of and is situated downstream of said first duct; and throttling the stream in the second duct to a degree which is inversely proportional to the volume of the stream entering said first duct in a given unit of time, so that at full load operation there will be minimum throttling while at partial load operation there will be throttling to a degree determined by the extent to which the partial load is less than the full load, whereby at partial load operation when there is a relatively small difference between the speeds of the gas and liquid droplets in the first duct a relatively great difference between said speeds will be provided in said second duct to achieve a high degree of separation of the solids from the gas.

2. In a process as recited in claim 1 and wherein a blower directs the stream through said first and second ducts, the step of providing in the second duct a degree of throttling which adapts the flow to the operating characteristics of the blower.

3. In a process as recited in claim 1, the step of inducing turbulence in the stream immediately subsequent to the throttling thereof in said second duct.

4. In a process as recited in claim 1, the step of propelling the stream through said second duct simultaneously with the throttling thereof.

5. In an apparatus for separating from a gas fine solid particles suspended therein, in combination, spray means for contacting the gas having said particles suspended therein with a liquid spray providing droplets for entraining the particles; a first duct communicating with said spray means for receiving the stream of sprayed gas therefrom; a second duct communicating with and situated downstream of said first duct for receiving the stream from said first duct; venturi means in said first duct for providing a relatively great differential between the speeds of movement of the gas and liquid droplets at full load operation; and regulating throttling flap means including a plurality of flaps pivotally connected to said second duct and turnable into the interior of said second duct for throttling the stream passing through said second duct, said flap means being turnable between one substantially not throttling end position and another substantially throttling position.

6. In an apparatus as recited in claim 5, said flaps including between themselves an angle of between 60 and 180° when said flaps are in said other end position.

7. In an apparatus for separating from a gas fine solid particles suspended therein, in combination, spray means for contacting the gas having said particles suspended therein with a liquid spray providing droplets for entraining the particles; a first duct communicating with said spray means for receiving the stream of sprayed gas therefrom; a second duct communicating with and situated downstream of said first duct for receiving the stream from said first duct; venturi means in said first duct for providing a relatively great differential between the speeds of movement of the gas and liquid droplets at full load operation; and regulating throttling flap means including a plurality of flaps pivotally connected to said second duct and turnable into the interior of said second duct for throttling the stream passing through said second duct, said flap means being turnable between one substantially not throttling end position and another substantially throttling position, said flaps, respectively, terminating in free edges which induce turbulence in the stream as it flows past said free edges.

8. In an apparatus for separating from a gas fine solid particles suspended therein, in combination, spray means for contacting the gas having said particles suspended therein with a liquid spray providing droplets for entraining the particles; a first duct communicating with said spray means for receiving the stream of sprayed gas therefrom; a second duct communicating with and situated downstream of said first duct for receiving the stream from said first duct; venturi means in said first duct for providing a relatively great differential between the speeds of movement of the gas and liquid droplets at full load operation; and regulating throttling flap means including a plurality of flaps pivotally connected to said second duct and turnable into the interior of said second duct for throttling the stream passing through said second duct, said flap means being turnable between one substantially not throttling end position and another substantially throttling position, said flaps having an asymmetrical arrangement for directing the stream to a third duct situated downstream of and communicating with said second duct.

References Cited

UNITED STATES PATENTS

| 2,256,374 | 9/1941 | Cummings | 55—90 |
| 2,852,239 | 9/1958 | Vicard | 55—257 X |
| 3,167,413 | 1/1965 | Kiekens et al. | 55—225 |

FOREIGN PATENTS

| 565,906 | 11/1923 | France. |
| 399,265 | 10/1933 | Great Britain. |

REUBEN FRIEDMAN, *Primary Examiner.*

J. W. ADEE, *Assistant Examiner.*